Sept. 26, 1967 W. C. RENWICK 3,343,658
EYEGLASS CASE
Filed Aug. 10, 1966

INVENTOR.
William C. Renwick
BY
Howard W. Hermann
ATTORNEY

United States Patent Office 3,343,658
Patented Sept. 26, 1967

3,343,658
EYEGLASS CASE
William C. Renwick, Midland, Mich., assignor to Dow Corning Corporation, Midland, Mich., a corporation of Michigan
Filed Aug. 10, 1966, Ser. No. 571,625
2 Claims. (Cl. 206—6)

ABSTRACT OF THE DISCLOSURE

A novel eyeglass case structure containing replaceable silicone treated tissues in which said tissues serve the dual function of providing a convenient and economical means for cleaning the glasses as well as providing an effective inner liner for the base and lid of the case itself.

---

This invention relates to new and improved eyeglass cases and more particularly to eyeglass cases containing silicone treated tissues in which said tissues serve the dual function of providing a cleansing means for the glasses as well as providing an effective inner liner for the eyeglass case itself.

Of virtual necessity in the production of various eyeglass cases is the provision of an inner lining which will effectively protect the glasses contained therein. In the past, felt, flock, or other soft fabrics and the like have been employed to achieve this purpose. Although these materials have been satisfactory to some extent, the use of such fabrics have resulted in many inherent deficiencies. For example, lint and other like particles tend to adhere to the lenses of the eyeglasses so that said lenses must be cleansed when the eyeglasses are removed just prior to use. Another deficiency is that the lining material eventually tears and the lenses of the eyeglasses are subjected to a harsh surface and have a tendency to become scratched or scarred.

The cleansing operation is generally accomplished by wiping the lenses with a tissue or other type material suitable for such use. Among the available materials employed for this purpose are silicone treated tissues which effectively perform that function. At present, these silicone treated tissues are offered in individual packages much like book matches and are normally carried in the pocket of the consumer.

An object of the present invention is to provide new and improved eyeglass cases that contain replaceable silicone treated tissues which serve as an inner liner for said case.

It is also an object of this invention to provide an eyeglass case structure which will preclude the necessity of cleansing the eyeglasses each time they are removed from the case.

Another object is to provide new eyeglass cases which eliminate the aforementioned deficiencies in prior art eyeglass case structures.

In accordance with these and other objects there is provided by the present invention an eyeglass case which case comprises a base member upon which is mounted a lid. The eyeglass case has a pocket forming flange which is turned over a portion of the top of the case to provide a convenient means for a locking member to couple with a locking member on the lid of said case. The lid portion of the case also has a flange so that a fairly shallow pocket is formed. The inner portion of the base and lid members have appropriately seated therein treated tissues which completely surround the eyeglasses while they are in the case. Once the treated tissue is inserted it substantially covers the inner surface of the base and lid members thus serving as an inner lining for the eyeglass case.

Other objects and attendant advantages of the invention will become obvious to those skilled in the art from a consideration of the following detailed description when read in conjunction with the accompanying drawings wherein.

Figure 1:
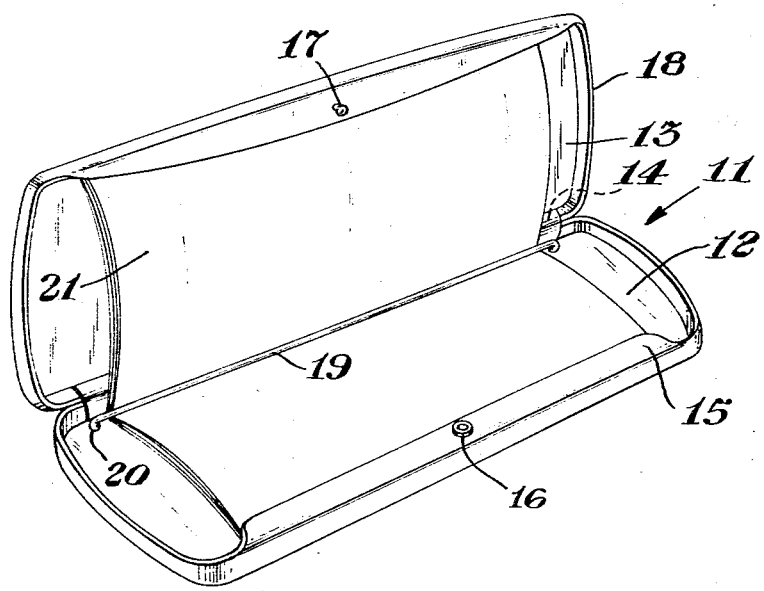
FIG. 1 is a view in perspective of an eyeglass case made in accordance with the present invention.
Figure 2:
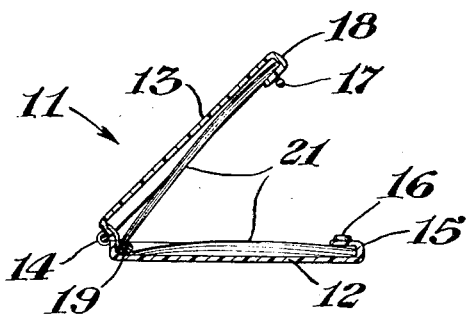
FIG. 2 is a cross-sectional view of the eyeglass case shown in FIG. 1, taken along line 2—2 of the figure and viewed in the direction of the arrows.

Referring now to the drawings, wherein like reference numerals designate like or corresponding parts through the two views, there is shown in FIG. 1 an eyeglass case 11 comprising a base member 12 upon which is mounted a hinged lid 13 biased by a spring means 14 to a closed position. The base member 12 has a pocket forming flange member 15 which is turned over a portion of the top of the case to provide a convenient means for a locking member 16 to couple with a locking member 17 located on the hinged lid 13. The hinged lid 13 also has a flange member 18 so that a fairly shallow pocket is formed. At the point where the base member 12 and the hinged lid 13 are attached, there is provided a rod 19 held in position by a supporting member 20. Singular or multiple silicone treated tissues 21 are then placed under and held firmly by the rod 19, the extremities of the tissue or tissues being held in place by the flange members 15 and 18. When the silicone treated tissues 21 are inserted they provide an inner lining for the case and completely surround the eyeglasses which are carried therein, as may be seen more clearly from FIG. 2.

The use of the silicone treated tissues for this purpose very effectively serve as the inner lining for the case itself. This of course precludes the necessity of coating the inner portion of the case with felt, flock, or a similar like material.

Numerous advantages are obvious when using the silicone treated tissues in this fashion. In addition to providing a superior lining for the eyeglass case, the treated tissues are replaceable and hence, can be individually removed to further clean the eyeglasses if so desired. With a silicone treated tissue liner as described herein, the eyeglasses will be continually cleaned by simply having them in the case itself, thus making the invention both useful and beneficial to the ultimate consumer. Furthermore, in prior art eyeglass cases the inner lining material can easily tear or rip and hence, the glasses will be subjected to plastic, metal or a like material which facilitates the possibility of permanently scratching or scarring the lenses of the eyeglasses. Such deleterious effects are minimized and virtually nonexistent when employing the invention as herein described.

The accessories shown are merely exemplary of possible variations of the invention. For further example, rather than having the flange members extending over the silicone treated tissues, additional rods may be provided to hold the tissues in position or the rods and flange members may be absent, the tissues being maintained in position by only the single rod at the point of attachment of the base member and hinged lid member, however, due to the advantages obtained, the preferred embodiment of this invention is as illustrated in the accompanying drawings. In addition, the hinge which biases the lid to a closed position may be offset and comprised of a rod so that said hinge serves both as a spring means for closing the lid as well as maintaining the treated tissues in position. For still further example, the hinge which biases the lid to a closed position may be a leather or sewn hinge, a case of this type normally being opened by simply pressing the edges together. The locking member can also be of varying design such as a flap with a button type lock among others. In essence, it is readily understood that a case of any type design composed of any type material can be easily modified so that it is encompassed within the scope of this invention.

While the invention has been described for use as an eyeglass case it will be realized by those skilled in the art that it is adaptable for use for countless other purposes. Many variations other than those described, will also become obvious to those skilled in the art from a consideration of the foregoing. Therefore, it is to be understood that, within the scope of the appended claims, the invention may be practiced, otherwise than as specifically disclosed.

That which is claimed is:

1. An eyeglass case comprising a base member, a hinged lid mounted thereon, a rod means positioned within the case adjacent to the hinge, said rod means releasably retaining an inner lining composed of a plurality of replaceable treated tissues within the case and flange members on the base and lid opposite to the hinge to releasably retain the edges of said tissues within the case.

2. An eyeglass case as defined in claim 1 in which the tissue is treated with silicone.

References Cited
UNITED STATES PATENTS

| | | | |
|---|---|---|---|
| 903,737 | 11/1908 | Lembcke | 206—5 |
| 2,332,266 | 10/1943 | Segal | 206—6 |
| 3,048,878 | 8/1962 | Gray et al. | 15—512 |

THERON E. CONDON, *Primary Examiner.*

W. T. DIXSON, JR., *Assistant Examiner.*